United States Patent

Neufer et al.

[11] Patent Number: 5,827,072
[45] Date of Patent: Oct. 27, 1998

[54] GRAPHIC, SPORTS-RELATED INSTRUCTION BOARD

[76] Inventors: David J. Neufer, 5228 View Point Dr. NW., Gig Harbor, Wash. 98335; Stephen Bressler, 21706 SE. 32nd Pl., Issaquah, Wash. 98029

[21] Appl. No.: 920,380

[22] Filed: Aug. 29, 1997

Related U.S. Application Data

[63] Continuation of Ser. No. 613,742, Feb. 21, 1996, abandoned.

[51] Int. Cl.⁶ ..................................... B43L 1/00
[52] U.S. Cl. .................. 434/416; 434/408; 434/415; 434/248; 434/247; 434/251
[58] Field of Search .................. 434/247, 248, 434/251, 250, 255, 408, 413, 415, 416; 283/49; 40/718, 405, 124.06; 24/67.1

[56] References Cited

U.S. PATENT DOCUMENTS

| | | |
|---|---|---|
| D. 267,809 | 2/1983 | Lowery et al. ............ D19/99 |
| 1,927,695 | 9/1933 | Andreas . |
| 2,876,022 | 3/1959 | Kroviak . |
| 3,553,864 | 1/1971 | Karlyn et al. ............ 434/408 X |
| 3,560,092 | 2/1971 | Coney . |
| 3,642,191 | 2/1972 | Roof ............ 434/408 X |
| 3,685,170 | 8/1972 | Fairleigh ............ 434/248 |
| 4,676,527 | 6/1987 | Palmer ............ 434/248 X |
| 4,968,258 | 11/1990 | Kees ............ 434/408 X |
| 5,087,079 | 2/1992 | Morris, Jr. . |
| 5,137,453 | 8/1992 | Hudson ............ 434/415 X |
| 5,626,478 | 5/1997 | Gatlin ............ 434/247 |

FOREIGN PATENT DOCUMENTS 1595948 8/1981 United Kingdom ............ 434/416

OTHER PUBLICATIONS

"Finger Alone Erases Play Board Surface", The Sporting Goods Dealer (Catalog), p. 193, Mar. 1979.

Primary Examiner—Jeffrey A. Smith
Attorney, Agent, or Firm—Dean A. Craine

[57] ABSTRACT

A realistic, graphic, sport-related instruction board is provided which includes a board structure made of transparent, durable material having a planar top surface and a planar bottom surface. Disposed inside the board structure is a display panel which has at least one realistic, graphic, sport-related surface printed thereon. In an alternative embodiment, the display panel has two realistic, graphic, sport-related surfaces printed on opposite surfaces. A writing instrument containing dry-erasable ink is removably attached to the top or bottom surface of the writing board. By disposing the display panel inside the transparent board structure, viewers can see the display panel's realistic graphic surfaces when viewing the board structure. Coaches can write directly on the surface of the board structure directly over selected areas sport-related surface to instruct players how to play the sport. Also, by disposing the display panel inside the board structure, the display panel is protected against water and abrasions. The top and bottom surfaces of the board structure can have either a high gloss or matte finish.

13 Claims, 6 Drawing Sheets

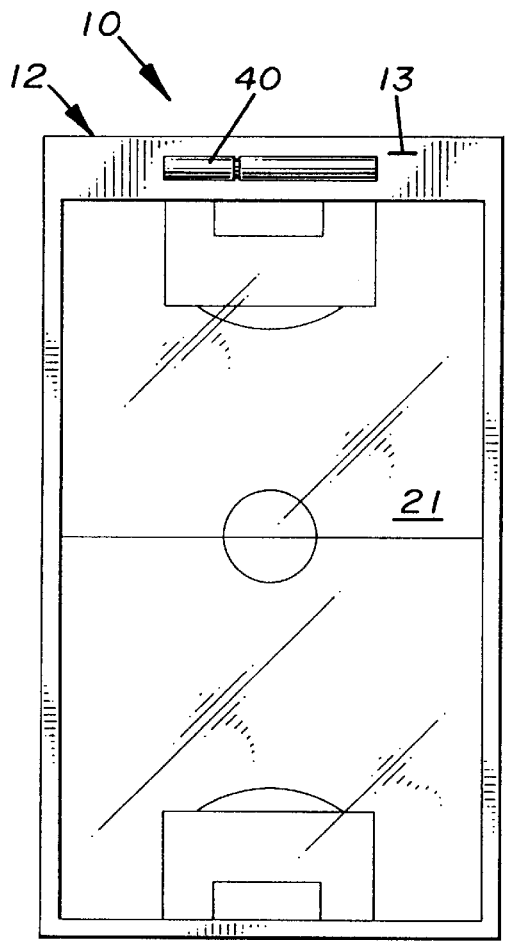
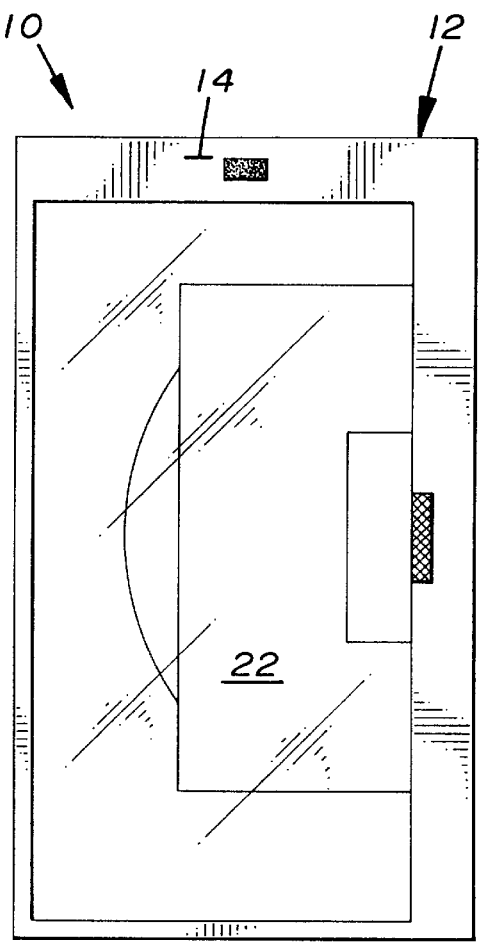
FIG. 2  FIG. 3
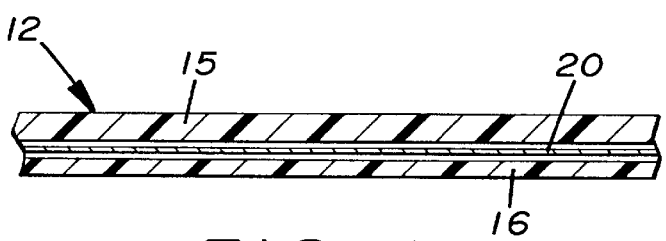
FIG. 4

GRAPHIC, SPORTS-RELATED INSTRUCTION BOARD

This is a continuation of application Ser. No. 08/613,742 filed on Feb. 21, 1996 (now abandoned).

BACKGROUND OF THE INVENTION

1. Field of the Invention

An apparatus that has educational effect and value for teaching individuals how to play a particular game, sport, or the like and, more particularly, to such an apparatus that uses a realistic viewing interface to improve the learning process.

2. Description of the Related Art

A sport-related writing boards or clipboards with the outline of a simulated playing field or court produced on one planar surface thereof are commonly used by coaches to teach players how to play a particular sport. Generally, such clipboards are made of pressboard material with a white, dry-erasable surface on one planer surface. Black paint or similar material is used to indicate the general outline of the playing field or court on the white surface.

One drawback with such clipboards is that they are not sufficiently realistic or detailed for teaching players how to play the sport. This is especially true when teaching younger players who need more realistic and detailed teaching tools than older players. A clipboard which has a more realistic and detailed playing field or court depicted on its planer surface would be desirable. Heretofore, clipboards having such features are too expensive to manufacture.

Another drawback with sport-related clipboards is that they are not sufficiently durable. Often during use, they are exposed to water or moisture which causes them to warp or break apart. In addition, the white surface or the black markings painted thereon become scratched or marred during use which can destroy their teaching value. A clipboard which is sufficiently durable to withstand water and moisture and is scratch resistant would also be desirable.

Another drawback with such clipboards is that only one surface is provided for writing or drawing. When teaching a particular sport to players, such as basketball, it is sometimes desirable to show them how to set up at one particular area on the court and then move to another area. It is also sometimes desirable to show them the various options they have on the court. A sports board which has multiple full or partial playing surfaces which enables the coach to show sequential moves or options would also be desirable.

SUMMARY OF THE INVENTION

It is an object of the present invention to provide a sports-related instruction board which is economical to manufacture.

It is another object of the present invention to provide such an instruction board with a realistic, graphical interface.

It is a further object of the present invention to provide such an instruction board which is moisture-proof and scratch resistant.

It is a still further object of the present invention to provide such an instruction board which has one or more graphic interfaces on opposite surfaces.

These and other objects which shall become apparent are met by providing the graphic, sport-related instruction board disclosed herein. The instruction board includes a board structure made of transparent, durable material having a planar top surface and a planar bottom surface. Disposed inside the board structure is a display panel which has at least one realistic, graphic, sport-related surface printed thereon. In an alternative embodiment, the display panel has two realistic, graphic, sport-related surfaces printed on opposite surfaces. A writing instrument containing dry-erasable ink is removably attached to the top or bottom surface of the writing board.

The board structure is made of durable, lightweight, water-proof, transparent material. During manufacture, the display panel is permanently sealed and fixed in position inside the transparent board structure, thereby protecting it from moisture and abrasions. The first and second graphic surfaces are realistic, detailed photographs or prints of a full or partial field or court. During use, viewers can see the first or second graphic surfaces when viewing the board structure. The first and second graphic surfaces can be color-coded for a particular team or sport or advertiser. Coaches can write directly on the surface of the board structure directly over selected areas sport-related surface to instruct players how to play the sport. The top and bottom surfaces of the board structure can have either a matted or high gloss finish.

BRIEF DESCRIPTION OF THE DRAWINGS

FIG. 2 is a top plan view of the sport-related writing board.

FIG. 3 is a bottom plan view of the sport-related writing board.

FIG. 4 is a sectional, side elevational view of the writing board.

DESCRIPTION OF THE PREFERRED EMBODIMENT(S)

Figure 1:
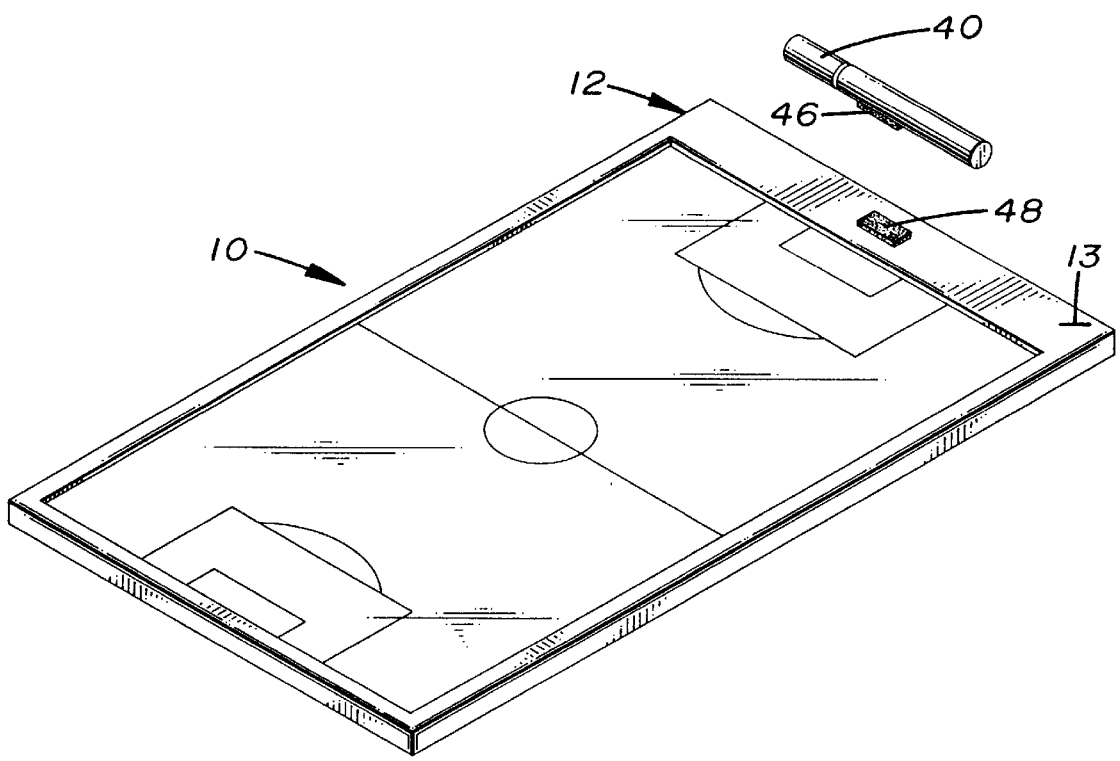
FIG. 1 is a perspective drawing of the graphic, sport-related writing board disclosed herein.

Shown in the accompanying FIGS. 1–5E, there is shown a sport-related instruction board, generally referred to as 10, designed to be used by coaches to teach players how to play a particular sport.

The instruction board 10 includes a board structure 12 made of transparent, durable, water-proof material having a planar top surface 13 and a planar bottom surface 14. Disposed inside the board structure 12 is a display panel 20 which has at least one realistic, graphic, sport-related top surface, generally referred to as first graphic surface 21, printed thereon. In an alternative embodiment, the display panel 20 has a realistic, graphic, sport-related bottom surface generally referred to as a second graphic surface 22,. A writing instrument 40 containing dry-erasable ink is removably attached to the top and/or bottom surface of the board structure 12 by a holding means. In the embodiment shown, the holding means is a pair of pads, 46, 48 made of hook and loop connector material VELCRO adhesively attached to the surfaces 13, 14 and the writing instrument 40.

In the preferred embodiment, the board structure 12 is rectangular shape and made of two sheets 15, 16 of transparent, rigid vinyl material, pressed together and heat sealed along their contacting surfaces. When assembled, the board structure 12 is water-proof and sufficiently rigid and resistant to scratches and breakage during normal use. In the preferred embodiment, the board structure 12 measures between 9 to 12 inches in width, 14 to 18 in length, and 0.07 to 0.08 inches in thickness.

As shown more clearly in FIG. 4, the display panel 20 is disposed inside the transparent board structure 12. This enables viewers to easily see the first and second graphic surfaces 21, 22 printed thereon when viewing the board structure 12. Because the display panel 20 is disposed inside the board structure 12, it is protected against scratches and moisture during use.

The display panel 20 is made of paper or some other suitable material approximately ½ inch less in length and width than the board structure 12. During assembly, the display panel 20 is disposed over the top surface of first sheet 15 of rigid vinyl material. The second sheet 16 of rigid vinyl material is then placed over the first sheet 15 and heat welded together to permanently seal and fix the display panel 20 inside the board structure 12.

Figure 5A:
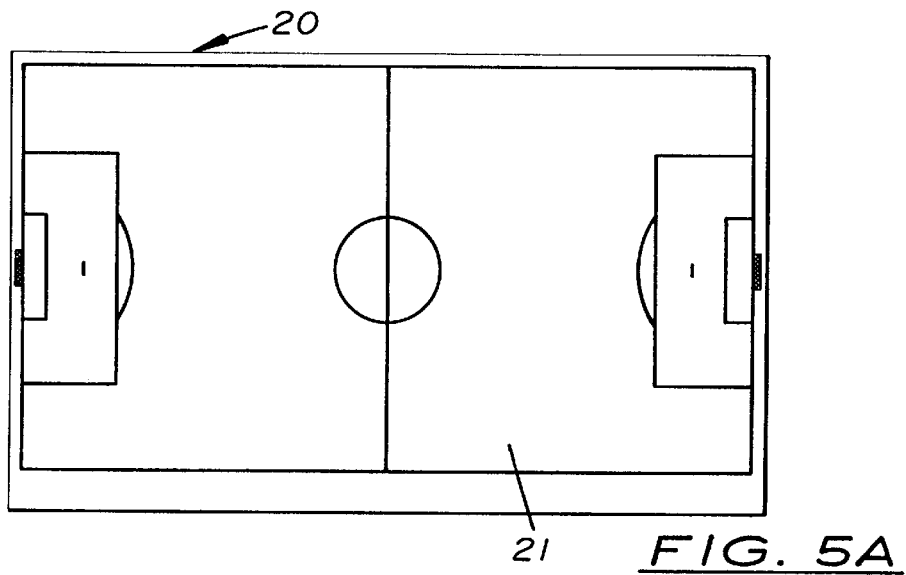
FIGS. 5A–5J are illustrations of five different sets of display panels.
Figure 5B:
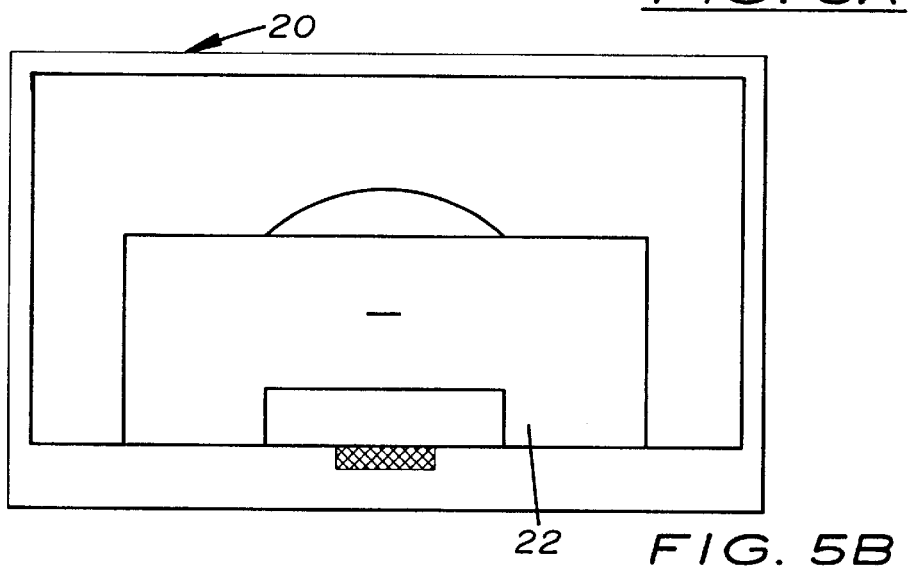

In one embodiment, the first graphic surface 21 is a full green or tan soccer field as shown in FIG. 5A. The optional second graphic surface 22 is an enlarged view of one half of the soccer field shown on the first graphic surface 21 as shown in FIG. 5B.

Figure 5C:
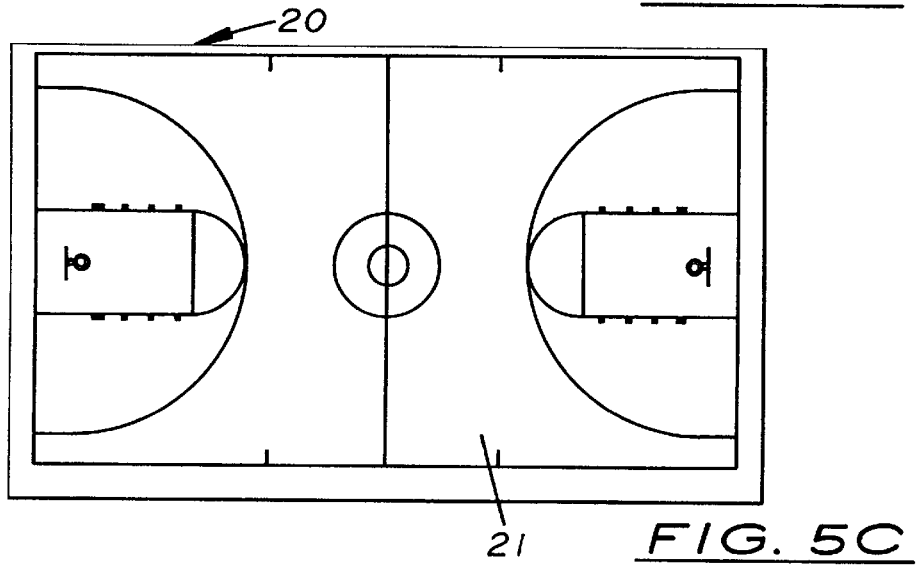
Figure 5D:
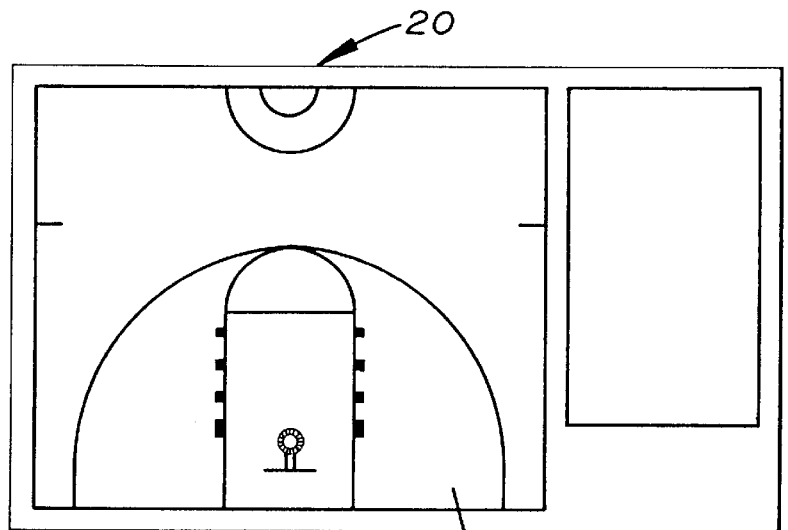

In another embodiment, the first graphic surface 21 is a full basketball court as shown in FIG. 5C. The main basketball court is tan to simulate a wooden floor while the lines, blocks, and lane area are contrasting colors. The optional second graphic surface is an enlarged view of one half the basketball court shown on the first graphic surface 21 as shown in FIG. 5D.

Figure 5E:
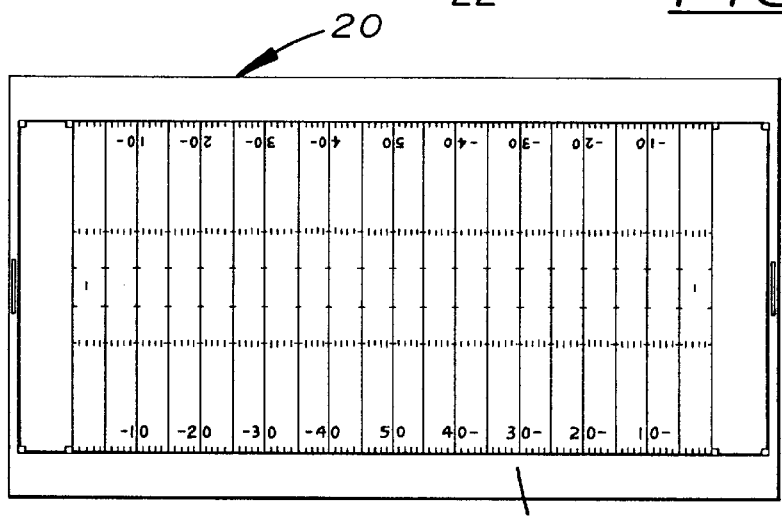
Figure 5F:
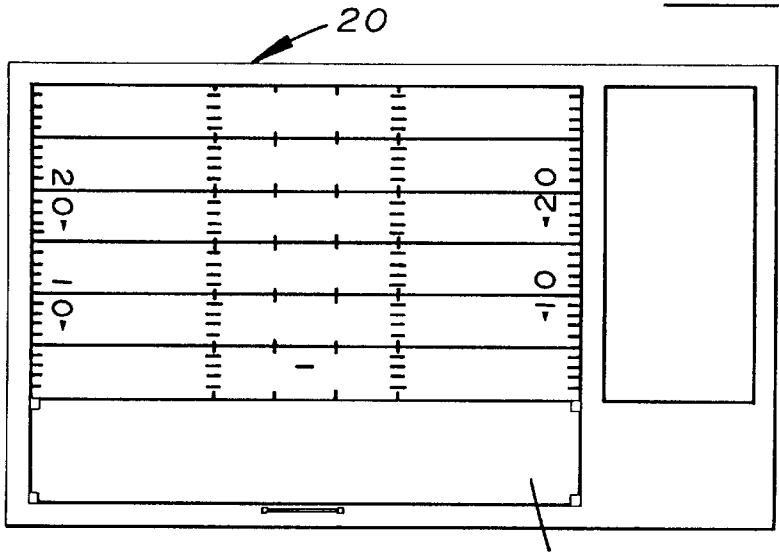
Figure 5G:
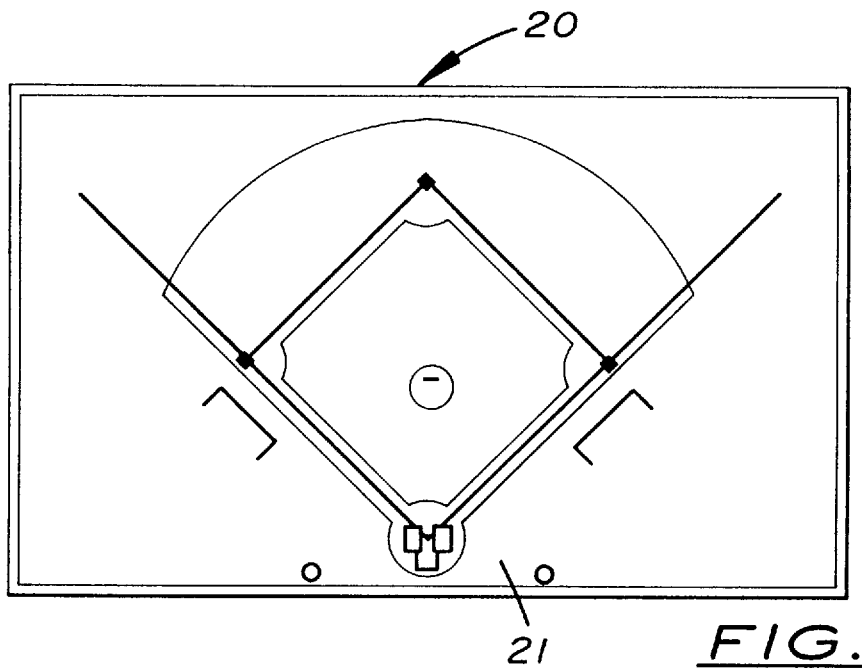

In another embodiment, shown in FIG. 5E, the first graphic surface 21 is a full, green football field with contrasting sidelines, end zone lines, hash marks, and yard markings. The optional second graphic surface 22 is an enlarged view of one half the football field shown on the first graphic surface 21 as shown in FIG. 5F.

Figure 5H:
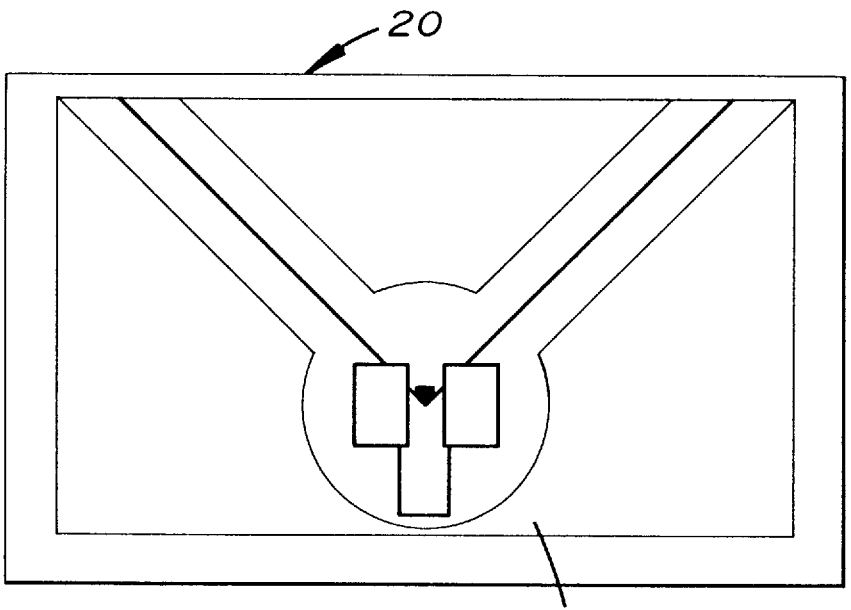
Figure 5I:
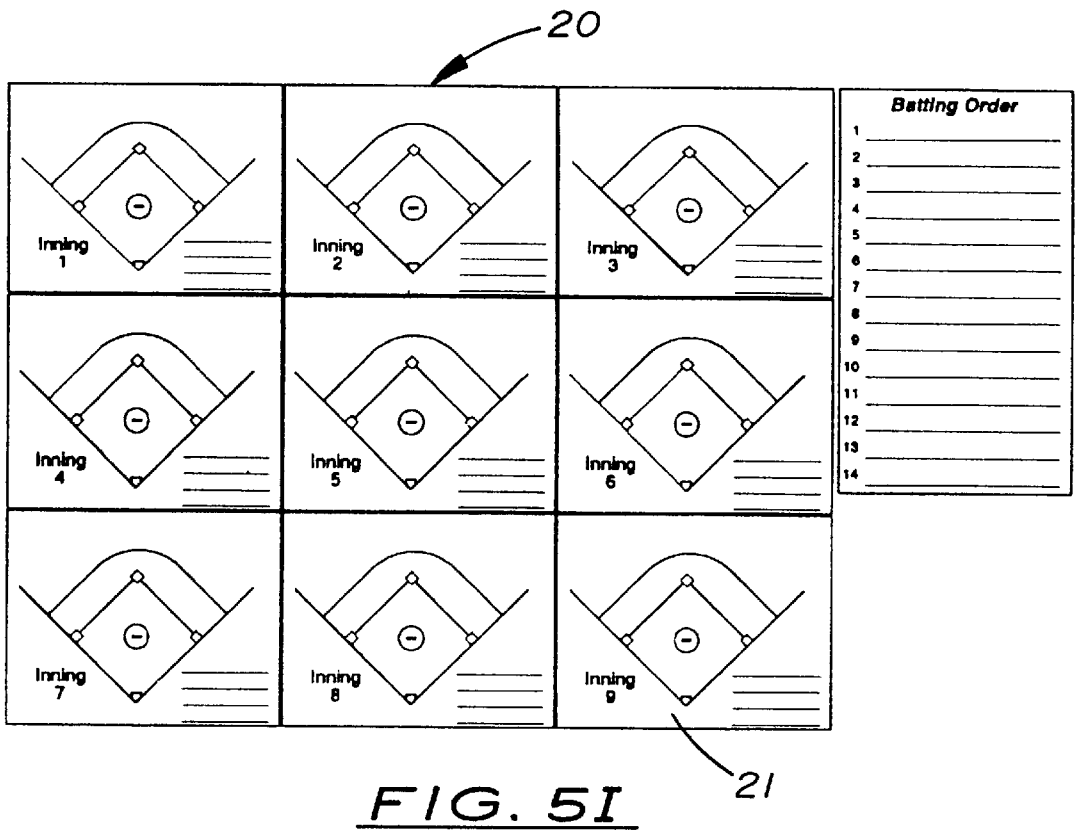
Figure 5J:
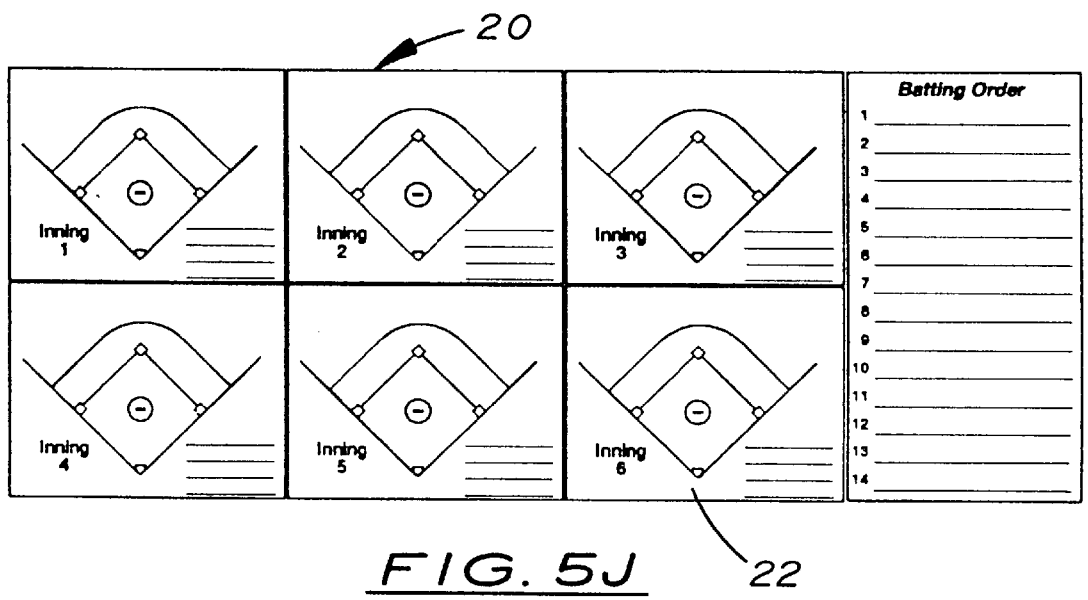

As shown in FIG. 5C, another embodiment shows the first graphic surface 21 being a full baseball field having simulated grass outfield and infield areas, and simulated dirt and batting area. The optional second graphic surface 22 is either an enlarge view of the batter's box area shown in the first graphic surface 21 as shown in FIG. 5H or one of the two sets of combination baseball diamonds and batter's lists as shown in FIG. 5I ad 5J, respectively.

In compliance with the statute, the invention, described herein, has been described in language more or less specific as to structural features. It should be understood, however, that the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A sport-related instruction board, comprising:
   a) a board structure made of transparent material, said board structure having a top surface and a bottom surface;
   a display panel disposed and permanently sealed inside said board structure, said display panel having a top surface and a bottom surface, said top surface having a realistic, sport-related, first graphic surface printed thereon and said bottom surface having a realistic, sport-related, second graphic surface printed thereon;
   c) said first graphic surface being a soccer field; and,
   d) said second graphic surface being a smaller portion of said soccer field.

2. A sports-related instruction board as recited in claim 1, wherein said top surface of said board structure has a matte finish.

3. A sports-related instruction board as recited in claim 1, wherein said top surface of said board structure has a high gloss finish.

4. A sports-related instruction board as recited in claim 1, wherein said bottom surface of said board structure has a matte finish.

5. A sport-related instruction board, as recited in claim 1, wherein said bottom surface of said board structure has a high gloss finish.

6. A sport-related instruction board, comprising:
   a) a board structure made of transparent material, said board structure having a top surface and a bottom surface;
   b) a display panel disposed and permanently sealed inside said board structure, said display panel having a top surface and a bottom surface, said top surface having a realistic, sport-related, first graphic surface printed thereon and said bottom surface having a realistic, sport-related, second graphic surface printed thereon;
   c) said first graphic surface being a basketball court; and,
   d. said second graphic surface being a smaller portion of said basketball court.

7. A sports-related instruction board as recited in claim 6, wherein said top surface of said board structure has a matte finish.

8. A sports-related instruction board as recited in claim 6, wherein said top surface of said board structure has a high gloss finish.

9. A sports-related instruction board as recited in claim 6, wherein said bottom surface of said board structure has a matte finish.

10. A sport-related instruction board, as recited in claim 6, wherein said bottom surface of said board structure has a high gloss finish.

11. A sport-related instruction board, comprising:
    a) board structure made of transparent material, said board structure having a top surface and a bottom surface;
    b) a display panel disposed and permanently sealed inside said board structure, said display panel having a top surface and a bottom surface, said top surface having a realistic, sport-related, first graphic surface printed thereon and said bottom surface having a realistic, sport-related, second graphic surface printed thereon;
    c) said first graphic surface being a football field; and,
    d. said second graphic surface being a smaller portion of said football field.

12. A sport-related instruction board 10 comprising:
    a) a board structure made of transparent material, said board structure having a top surface and a bottom surface;
    b) a display panel disposed and permanently sealed inside said board structure, said display panel having a top surface and a bottom surface, said top surface having a realistic, sport-related, first graphic surface printed thereon and said bottom surface having a realistic, sport-related, second graphic surface printed thereon;
    c) said first graphic surface being a baseball field and batter's box; and,
    d. said second graphic surface being a smaller portion of said baseball field and batter's box.

13. A sport-related instruction board, comprising:
    a) a board structure made of transparent material, said board structure having a top surface and a bottom surface;

b) a display panel disposed and permanently sealed inside said board structure, said display panel having a top surface and a bottom surface, said top surface having a realistic, sport-related, first graphic surface printed thereon and said bottom surface having a realistic, sport-related, second graphic surface printed thereon;

c) said first graphic surface being a baseball field; and, d. said second graphic surface capable of listing the names, depicting the positions and the batting order.

* * * * *